(12) United States Patent
Shin et al.

(10) Patent No.: US 6,732,672 B2
(45) Date of Patent: May 11, 2004

(54) TRIMARAN TYPE WING EFFECT SHIP WITH SMALL WATERPLANE AREA

(75) Inventors: Myung-Soo Shin, Daejeon (KR); Yong-Jin Jo, Daejeon (KR)

(73) Assignee: Korea Ocean Research and Development Institute, Daejeon (KR)

( * ) Notice: Subject to any disclaimer, the term of this patent is extended or adjusted under 35 U.S.C. 154(b) by 0 days.

(21) Appl. No.: 10/190,906

(22) Filed: Jul. 8, 2002

(65) Prior Publication Data

US 2003/0066471 A1 Apr. 10, 2003

(30) Foreign Application Priority Data

Oct. 8, 2001  (KR) ........................................ 2001-61827

(51) Int. Cl.[7] ................................................ B63B 1/16
(52) U.S. Cl. ...................... 114/272; 114/61.1; 180/116; 244/105
(58) Field of Search ................................ 114/271, 272, 114/273, 61.1, 67 A; 244/101, 105, 106; D12/2–4, 305, 324; 180/116, 117–122

(56) References Cited

U.S. PATENT DOCUMENTS 1,358,527 A * 11/1920 Curtiss ........................ 244/55
1,603,711 A * 10/1926 Peck et al. ..................... 244/2
1,675,988 A *  7/1928 O'Connor ................... 244/105

(List continued on next page.)

FOREIGN PATENT DOCUMENTS

GB         2110169 A  *  6/1983   ............. B63B/7/08

*Primary Examiner*—S. Joseph Morano
*Assistant Examiner*—Ajay Vasudeva
(74) *Attorney, Agent, or Firm*—Cantor Colburn LLP

(57) ABSTRACT

A trimaran type WIG (Wing-In-Ground) effect ship with a minimum waterplane area is disclosed. This WIG ship comprises a main hull and two half-submerged sub-hulls each having a minimum waterplane area capable of minimizing the wave resistance and appendage resistance of the ship, thus reducing speed loss on rough water. The WIG ship also has main and sub-wings and an effective propelling mechanism, designed such that they produce a strong lift force allowing a take-off of the ship sailing on water even at a low speed. The WIG ship is thus excellent in its seakeeping and maneuverability on the rough water. In the WIG ship, the main hull is intermediately positioned between the main wings and comprises a slender and half-submerged body, and bears 60% of the total displacement of the ship. The sub-hulls are respectively provided under the outer ends of the main wings, and each bear 20% of the total displacement, and act as an end plate. This WIG ship also has two sailing propellers each supplying 25% of maximum required power of the ship, and a flight propeller supplying 50% of the maximum required power.

4 Claims, 4 Drawing Sheets

U.S. PATENT DOCUMENTS

| | | | | |
|---|---|---|---|---|
| 1,720,698 A | * | 7/1929 | Staiger | 244/105 |
| 1,865,749 A | * | 7/1932 | Fleet | 89/1.51 |
| 1,890,553 A | * | 12/1932 | Young | 244/101 |
| 1,893,908 A | * | 1/1933 | Rohrbach | 244/106 |
| 1,917,446 A | * | 7/1933 | Hitt | 114/273 |
| D93,230 S | * | 9/1934 | Laddon | D12/324 |
| D95,619 S | * | 5/1935 | Sikorski | D12/324 |
| 2,068,618 A | * | 1/1937 | Wilford | 244/17.17 |
| 2,181,574 A | * | 11/1939 | Burnelli | 244/50 |
| 2,196,946 A | * | 4/1940 | Stone | 244/101 |
| 2,255,046 A | * | 9/1941 | Diehl | 244/106 |
| 2,311,161 A | * | 2/1943 | Dornier | 244/106 |
| 2,403,754 A | * | 7/1946 | Pierson | 244/135 R |
| 2,445,446 A | * | 7/1948 | Mas | 416/120 |
| D159,788 S | * | 8/1950 | Ebel et al. | D12/324 |
| 2,752,113 A | * | 6/1956 | Green | 244/105 |
| 3,321,158 A | * | 5/1967 | Di Stasi | 244/106 |
| 3,397,854 A | * | 8/1968 | Reyle | 244/55 |
| 3,599,903 A | * | 8/1971 | Handler | 244/13 |
| 3,627,235 A | * | 12/1971 | Lippisch | 244/12.1 |
| 3,830,448 A | * | 8/1974 | Lippisch | 244/2 |
| 3,965,836 A | * | 6/1976 | Malvestuto, Jr. | 114/272 |
| 4,705,234 A | * | 11/1987 | Bourn | 244/12.1 |
| 5,335,742 A | * | 8/1994 | Blum | 180/117 |
| D357,647 S | * | 4/1995 | Blum | D12/5 |
| 5,622,133 A | * | 4/1997 | Sinitsyn et al. | 114/272 |
| 5,697,468 A | * | 12/1997 | Russell et al. | 180/116 |
| 6,409,122 B1 | * | 6/2002 | Nicolai | 244/106 |
| 6,581,536 B1 | * | 6/2003 | Belloso | 114/61.1 |

* cited by examiner

TRIMARAN TYPE WING EFFECT SHIP WITH SMALL WATERPLANE AREA

BACKGROUND OF THE INVENTION

1. Field of the Invention

The present invention relates, in general, to trimaran type wing-in-ground effect ships and, more particularly, to a trimaran type wing-in-ground effect ship, which consists of one main hull and two half-submerged sub-hulls each having a minimum waterplane area capable of minimizing the wave resistance and appendage resistance of the ship, thus reducing resistance-induced speed loss on rough water, and which also has wings and an effective propelling mechanism, designed such that they produce a strong lift force allowing an effective take-off of the ship running on water even at a low speed, and which is thus excellent in its seakeeping and maneuverability on rough water.

2. Description of the Prior Art

Wing-in-ground effect ships (herein below referred to simply as "WIG ships") are vessels that sail on water at high speeds and take off from the water to fly in the air over the water. Such a WIG ship is designed such that it produces a surface effect by air captured under the main wings when it sails on water at a high speed with the wings suspended over the surface of water at a height of about 2~3 meters. Due to such a surface effect, the WIG ship increases the lift force without inducing an increase in the drag force, and so the WIG ship runs on water more stably and safely in comparison with conventional vessels or airplanes, thus having been used as a superhigh-speed water transportation system with excellent water transportation efficiency. Such WIG ships typically use a PAR (Power Augmented Ram) mechanism or an air cushion mechanism, and are typically used as vessels sailing on inland seas or inland waters, such as rivers or lakes without waves, in place of sailing on open seas along regular service lanes.

Examples of conventional vessels using such air cushion mechanisms are air cushion vehicles (ACV, so-called "hovercrafts") and surface effect ships (SES). In such an ACV or SES, two or more downward thrusting fans are installed under the skirt provided at the lower portion of the hull, and downwardly thrust highly pressurized air so as to pneumatically lift the hull over the surface of water. The ACV or SES can somewhat effectively run on quite water at a superhigh speed.

However, such an ACV or SES is excessively increased in the wave resistance and appendage resistance while sailing on rough water, and so it is almost impossible for them to accomplish desired take-off speeds or to produce a desired lift force required to take off from the water. Therefore, the ACV or SES cannot take off from the water when they sail on rough water. Another problem of such an ACV or SES resides in that they are inferior in seakeeping, and so they cannot stably take off from or alight on water. Therefore, the ACV and SES are in the early stages of being used practically even though they have superhigh-speed sailing effect and excellent water transportation efficiency. In an effort to accomplish the superhigh-speed sailing effect of vessels, large-scale thrusting engines or machines capable of generating high propelling force may be used in some vessels. However, the use of such large-scale thrusting engines or machines in vessels results in an exorbitant increase in the price of vessels, excessive consumption of fuel, and an increase in the plying cost, thus degrading economic efficiency of the vessels.

SUMMARY OF THE INVENTION

Accordingly, the present invention has been made keeping in mind the above problems occurring in the prior art, and an object of the present invention is to provide a trimaran type WIG ship, which consists of one main hull and two half-submerged sub-hulls each having a minimum waterplane area capable of minimizing the wave resistance and appendage resistance of the ship, thus reducing resistance-induced speed loss on rough water, and which also has wings and an effective propelling mechanism, designed such that they produce a strong lift force allowing an effective take-off of the ship running on water even at a low speed, and which is thus excellent in its seakeeping and maneuverability on rough water.

In order to accomplish the above objects, the present invention provides a WIG ship comprising a main hull, two sub-hulls, two main wings, two outer wings, two sailing propellers, a flight propeller, a rudder, and a horizontal stabilizer, wherein the main hull is intermediately positioned between the main wings and comprises a slender and half-submerged body, and bears 60% of the total displacement of the ship; the sub-hulls are respectively provided under the outer ends of the main wings, and each bear 20% of the total displacement, and act as end plates; the sailing propellers each supply 25% of maximum required power of the ship; and the flight propeller supplies 50% of the maximum required power.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
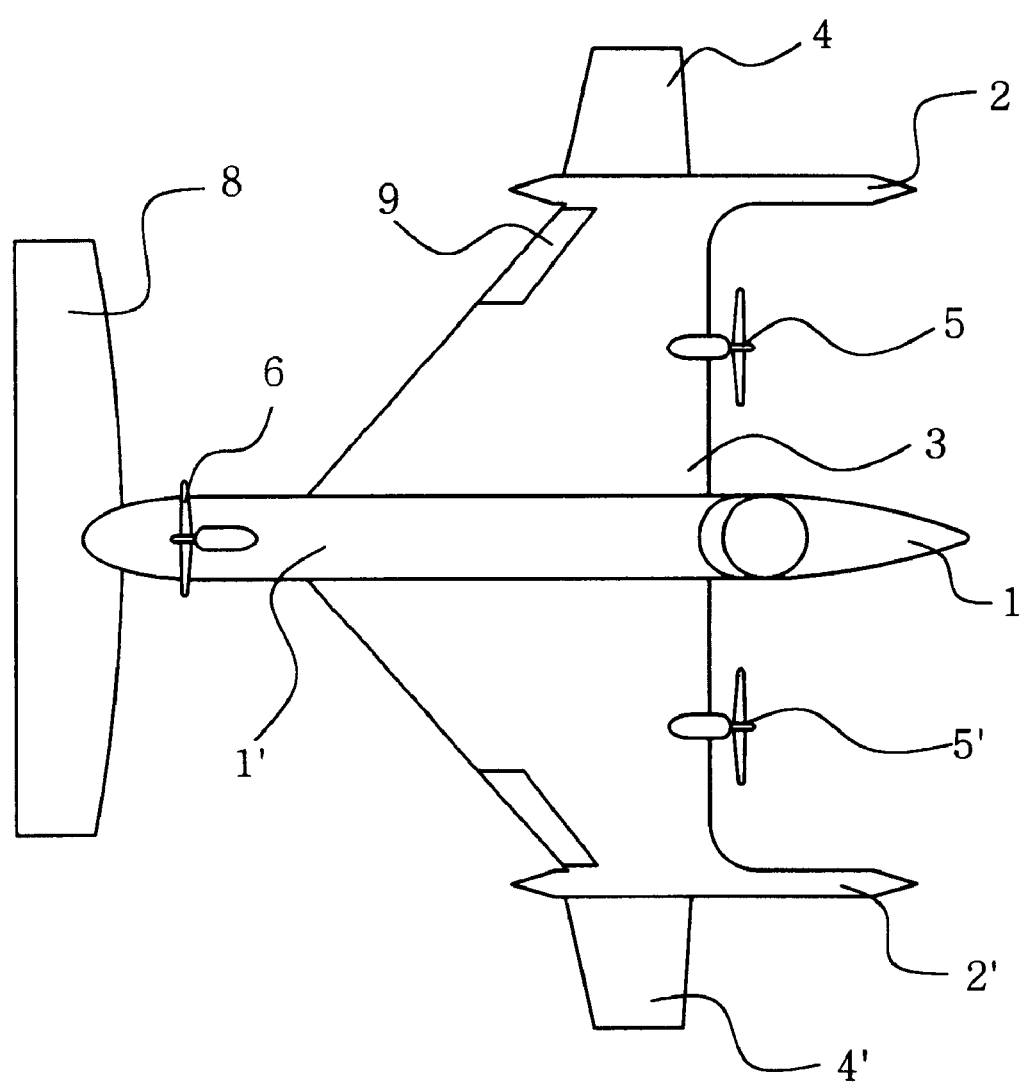
FIG. 1 is a plan view of a WIG ship in accordance with the preferred embodiment of the present invention.

Reference should now be made to the drawings, in which the same reference numerals are used throughout the different drawings to designate the same or similar components.

Figure 2:
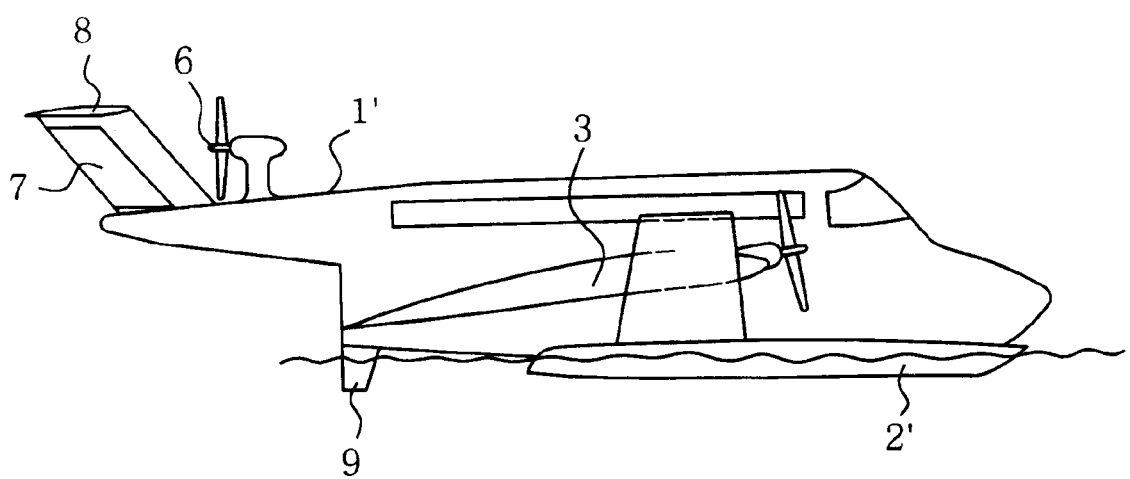
FIG. 2 is a side view of the WIG ship of this invention.
Figure 3:
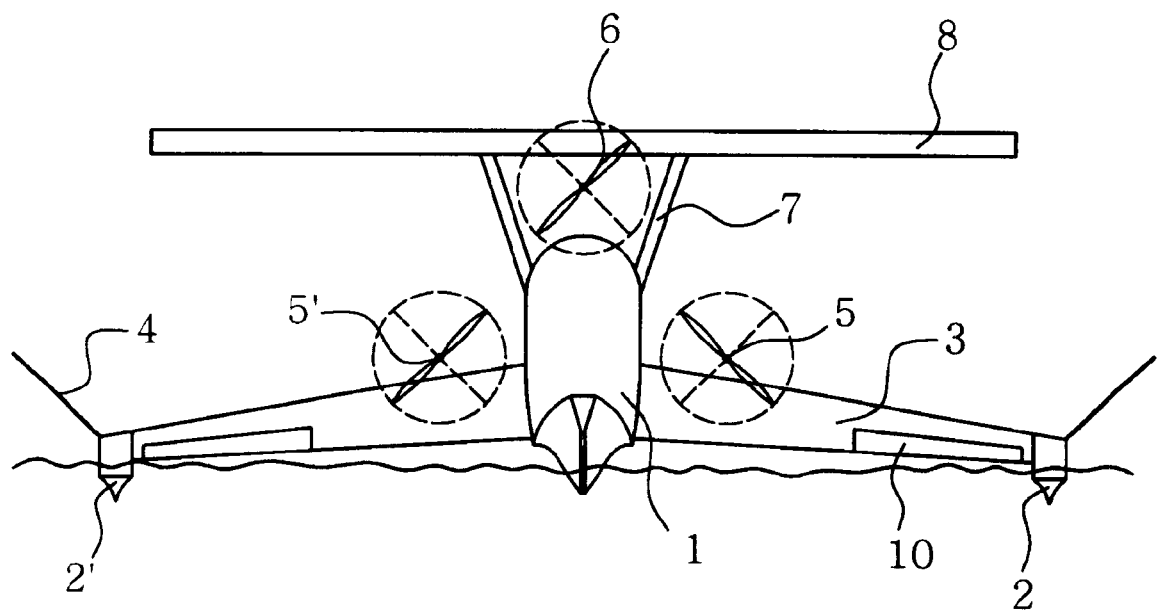
FIG. 3 is a front view of the WIG ship of this invention.
Figure 4:
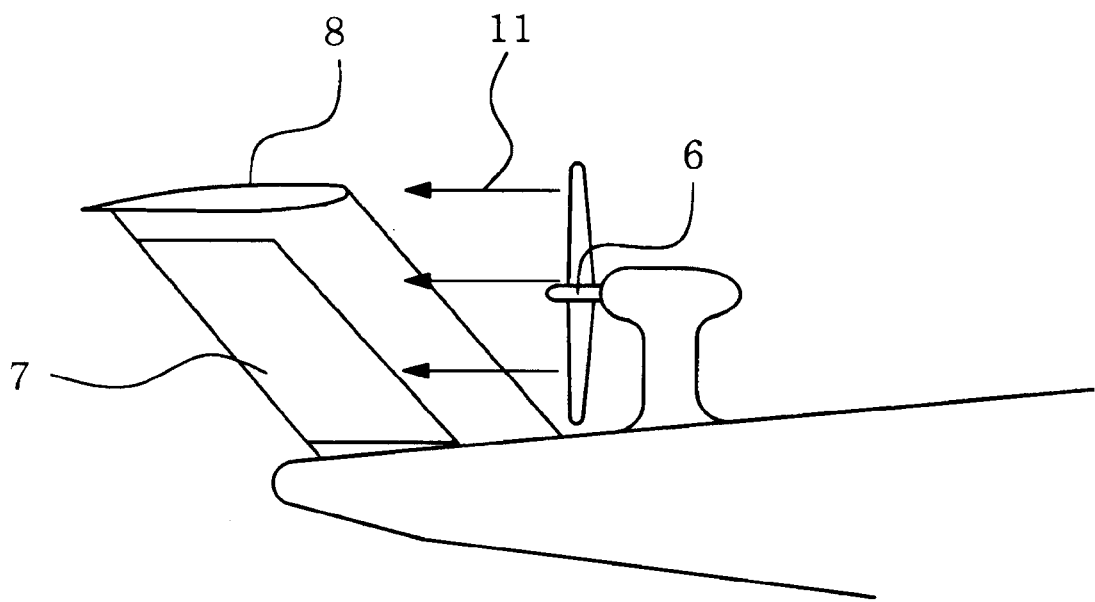
FIG. 4 is a side view, showing the construction and operation of a flight propeller and a tail assembly provided at the stern hull of the WIG ship according to this invention.

FIG. 1 is a plan view of a WIG ship in accordance with the preferred embodiment of the present invention; FIG. 2 is a side view of the WIG ship. FIG. 3 is a front view of the WIG ship. FIG. 4 is a side view, showing the construction and operation of a flight propeller and a tail assembly provided at the stern hull of the WIG ship.

As shown in FIGS. 1 to 3, the WIG ship of this invention comprises one main hull 1, two sub-hulls 2 and 2', and two main wings 3. The main hull 1 is intermediately positioned between the two main wings 3, and comprises a slender and half-submerged body. The stem of this main hull 1 has a configuration with a minimum waterplane area capable of minimizing the wave resistance and appendage resistance of the WIG ship on rough water, and so this WIG ship easily takes off from rough water. The two sub-hulls 2 and 2' are respectively provided under the outer ends of the two main wings 3, and each comprise a half-submerged body bearing a predetermined portion of total displacement of the WIG ship. The WIG ship of this invention has minimum resistance characteristics. The two sub-hulls 2 and 2' also act as end plates that improve the surface effect.

In an effort to minimize the wave resistance and appendage resistance of the WIG ship sailing on water, the three hulls, that is, the main hull 1 and the two sub-hulls 2 and 2' of this WIG ship are designed such that the portions of the total displacement carried by them are determined as follows. That is, the main hull 1 bears 60% of the total displacement, while the two sub-hulls 2 and 2' each bear 20% of the total displacement. In a brief description, the three hulls 1, 2 and 2' are designed such that the ratio of the portion of the total displacement carried by the main hull 1 to that of the two sub-hulls 2 and 2' becomes six to four.

The three hulls of this WIG ship including the main hull 1 and the two sub-hulls 2 and 2' each have a minimum waterplane area. In order to accomplish the minimum waterplane area, the slender and half-submerged body of the main hull 1 has a high length to width ratio of 12 or more. The two sub-hulls 2 and 2' are each half-submerged under the surface of water when the WIG ship is stopped on water or sails on water at a low speed, thus minimizing the wave resistance of the WIG ship. The sub-hulls 2 and 2' also minimize the appendage resistance of the WIG ship on rough water, thus allowing the WIG ship to reliably accomplish a take-off speed even on rough water. In a detailed description, about 70% of the two sub-hulls 2 and 2' are submerged under the water's surface when the WIG ship is stopped on water. However, the sub-hulls 2 and 2' float on the surface of the water and take off from the water to fly in the air over the water in accordance with an increase in the sailing speed of the WIG ship. That is, the sub-hulls 2 and 2' thus act as end plates.

The sub-hulls 2 and 2', acting as end plates, are perpendicularly mounted to the lower surfaces of the outer ends of the two main wings 3, and capture air under the main wings 3 when the WIG ship sails on water at a high speed with the wings 3 suspended over the surface of water at a predetermined height. The two sub-hulls 2 and 2' thus accomplish a desired surface effect, which increases the lift force. The lift coefficient explaining the surface effect is reduced in inverse proportion to the flight altitude, and is expressed by the ratio of the chord length of the main wings to the flight altitude. Therefore, the lift coefficient is increased in inverse proportion to the flight altitude, and in proportion to the chord length of the main wings, and an increase in the lift coefficient results in an increase in the surface effect.

In such a case, the datum level for the flight altitude is typically set to the center of the main wings. However, it should be understood that the lower surface of each end plate may be used as the datum level for the flight altitude.

The end plates thus play a very important role of increasing the surface effect, and the height of the end plates is a very important factor determining the surface effect. Typically, such end plates have a flat configuration. However, the WIG ship of this invention is designed such that the two sub-hulls 2 and 2', forming two side hulls of the trimaran type ship and bearing a predetermined portion of the total displacement of the ship, together perform the function of end plates. Therefore, the two sub-hulls 2 and 2' are perpendicularly mounted to the lower surfaces of the outer ends of the two main wings 3 such that they minimize the wave resistance and appendage resistance, and minimize the roll of the WIG ship to increase lateral stability of the ship. In addition, the half-submerged type sub-hulls 2 and 2' are designed such that they are positioned lower than the main hull 1, thus reducing the flight altitude. Such a reduction in the flight altitude of this WIG ship caused by the lower position of the sub-hulls 2 and 2' results in an increase in the surface effect.

The WIG ship of this invention also has two outer wings 4 that further increase the lateral stability of the ship in the same manner as conventional WIG ships. The two outer wings 4 are mounted to the outer ends of the two main wings 3 such that a predetermined angle is formed between each outer wing 4 and an associated main wing 3. The two outer wings 4 increase the lift force of the ends of the main wings 3, thus preventing a quick roll of the main hull 1 as well as improving the flight stability of the ship.

The stern hull 1' of this WIG ship is a boom type body integrally extending rearward from the stern of the main hull 1, and supports the tail assembly of the WIG ship.

In the WIG ship of this invention, two sailing propellers 5 and 5' are installed at the leading edges of the main wings 3, respectively, while one flight propeller 6 is installed on the main hull 1 at a position in front of a rudder 7 of the tail assembly. When the WIG ship of this invention requires the maximum power to sail on water at a high speed in order to take off from the water prior to flying in the air over the water, the two sailing propellers 5 and 5' and the flight propeller 6 are operated at the same time. However, during a flight of the WIG ship after take-off, only the flight propeller 6 positioned in front of the rudder 7 is operated. It is thus possible for the WIG ship of this invention to reduce the consumption of fuel, and reduce the operating time of the propellers, thus saving the plying cost and lengthening the life span of the propellers.

In an effort to accomplish the above object, the three propellers, that is, the flight propeller 6 and the two sailing propellers 5 and 5' of this WIG ship are designed such that the portions of the maximum required power supplied by them are determined as follows. That is, the flight propeller 6 supplies 50% of the maximum required power, while the two sailing propellers 5 and 5' each supply 25% of the maximum required power. In a brief description, the three propellers 5, 5' and 6 are designed such that the ratio of the portion of the maximum required power supplied by the flight propeller 6 to that of the two sailing propellers 5 and 5' becomes five to five. This means that the WIG ship of this invention can fly in the air over the water using 50% of the maximum power required to take off from rough water.

In a conventional airplane, the rudder and the horizontal stabilizer provided at the tail assembly quickly and precisely respond to manipulations of the controls by a pilot during a superhigh-speed flight, and desirably control the position and motion of the airplane. However, different from such airplanes, the position and motion of a WIG ship cannot be easily, quickly or precisely controlled when the ship sails on water at a low speed. In an effort to accomplish an easy, quick and precise control of the position and motion of the WIG ship, the flight propeller 6 is installed on the main hull 1 just in front of the rudder 7 and the horizontal stabilizer 8 as shown in FIG. 4 such that the rearward air currents 11 generated by the flight propeller 6 are guided to both the rudder 7 and the horizontal stabilizer 8.

In addition, the main hull 1 of this WIG ship is provided at the lower portion of the stern with a skeg 9, which is submerged in the water and ensures the straight sailing of the WIG ship. Particularly, in order to further ensure the straight sailing of this WIG ship without an increase in the hydraulic resistance of water on the skeg, the skeg 9 of this invention is designed such that it is submerged deeper in the water at its lower portion and is thinner in its cross-section than conventional skegs.

In the drawings, the reference numeral 10 denotes an aileron that is an appendage attached to the trailing edge of each main wing 3 to control the roll of the main hull in the same manner as a conventional airplane.

As described above, the present invention provides a trimaran type WIG ship with a minimum waterplane area. This WIG ship consists of a main hull and two half-submerged sub-hulls each having a minimum waterplane area capable of minimizing the wave resistance and appendage resistance of the ship, thus remarkably reducing resistance-induced speed loss on rough water. The WIG ship of this invention thus sails on rough water at a superhigh speed, and effectively takes off from rough water.

The WIG ship of this invention is provided with one flight propeller and two sailing propellers. When the WIG ship requires the maximum power to sail on water at a superhigh speed in order to take off from the water to fly in the air over the water, the two sailing propellers and the flight propeller are operated at the same time. However, during a flight of the WIG ship after take-off, only the flight propeller positioned in front of the rudder is operated. This WIG ship thus reduces the consumption of fuel, and reduces the operating time of the propellers, and so it saves the plying cost and lengthens the life span of the propellers.

In addition, this WIG ship is designed such that the position and motion of the WIG ship sailing or flying at a low speed can be easily, quickly and precisely controlled by the rudder and the horizontal stabilizer of the tail assembly in response to manipulations of the controls by a pilot. In order to accomplish the above object, the flight propeller is installed on the main hull in front of the rudder and the horizontal stabilizer such that the rearward air currents generated by the flight propeller are guided to both the rudder and the horizontal stabilizer.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A wing-in-ground effect ship comprising a main hull, sub-hulls, main wings, outer wings, sailing propellers, a flight propeller, a rudder, and a horizontal stabilizer, wherein said main hull is intermediately positioned between said main wings and comprises a slender and half-submerged body, and bears 60% of a total displacement of the ship;

said sub-hulls are respectively provided under outer ends of said main wings, and each bear 20% of the total displacement, and act as end plates;

said sailing propellers each supply 25% of maximum required power of the ship; and said flight propeller supplies 50% of said maximum required power wherein said sub-hulls are positioned lower than the said main hull so as to increase a surface effect of the ship, and each of said outer wings is mounted on an outer end of corresponding one of said main wings such that a predetermined angle is formed between each of said outer wings and said corresponding one of said main wings at said outer end.

2. The wing-in-ground effect ship according to claim 1, wherein said flight propeller is installed on the main hull at a position in front of said rudder.

3. The wing-in-ground effect ship according to claim 2, wherein the flight propeller is installed such that rearward air currents generated by the flight propeller are guided to both the rudder and the horizontal stabilizer of a tail assembly in order to control position and motion of the ship.

4. The wing-in-ground effect ship according to claim 1, wherein said main hull is provided at a lower portion of a stem thereof with a skeg, which is submerged deeper in the water at a lower portion thereof and is thinner in a cross-section thereof than conventional skegs in order to ensure a straight sailing of the ship without an increase in a hydraulic resistance of water on the skeg.

* * * * *